United States Patent [19]

Anderson et al.

[11] Patent Number: 5,767,024
[45] Date of Patent: Jun. 16, 1998

[54] COMBINED THERMAL AND ACOUSTIC INSULATOR

[75] Inventors: James Anderson; Chris Ragland, both of Duluth, Ga.

[73] Assignee: ATD Corporation, Norcross, Ga.

[21] Appl. No.: 626,878

[22] Filed: Apr. 3, 1996

[51] Int. Cl.$^6$ .................................................. B32B 15/14
[52] U.S. Cl. ........................ 442/378; 442/381; 442/394; 428/332; 428/340
[58] Field of Search .............................. 442/378, 381, 442/394; 428/332, 340

[56] References Cited

U.S. PATENT DOCUMENTS

| | | |
|---|---|---|
| 4,101,704 | 7/1978 | Hiles . |
| 4,367,259 | 1/1983 | Fulmer et al. . |
| 4,430,286 | 2/1984 | Franz . |
| 4,539,252 | 9/1985 | Franz . |
| 4,663,065 | 5/1987 | Herring . |
| 4,671,979 | 6/1987 | Adiletta . |
| 4,681,816 | 7/1987 | Hashimoto et al. . |
| 4,777,086 | 10/1988 | Madden et al. . |
| 5,400,296 | 3/1995 | Cushman et al. . |

*Primary Examiner*—Marion E. McCamish
*Assistant Examiner*—Elizabeth M. Cole
*Attorney, Agent, or Firm*—Burns, Doane, Swecker & Mathis

[57] ABSTRACT

A combined thermal and acoustic insulator comprises a first metallic material layer formed, for example, from a metal foil, a fibrous low density material batt layer adjacent the first metallic layer, a high density plastic material layer, for example, a mass loaded elastomer, adjacent the batt material layer, and a second metallic foil layer. The first metallic material layer forms the heat exposed side and the second metallic layer forms the shielded side of the insulator. Alternatively, additional layers may be provided, for example, a third foil layer adjacent the fibrous material layer and a second fibrous layer between the third metal foil layer and the first metal foil layer.

30 Claims, 1 Drawing Sheet

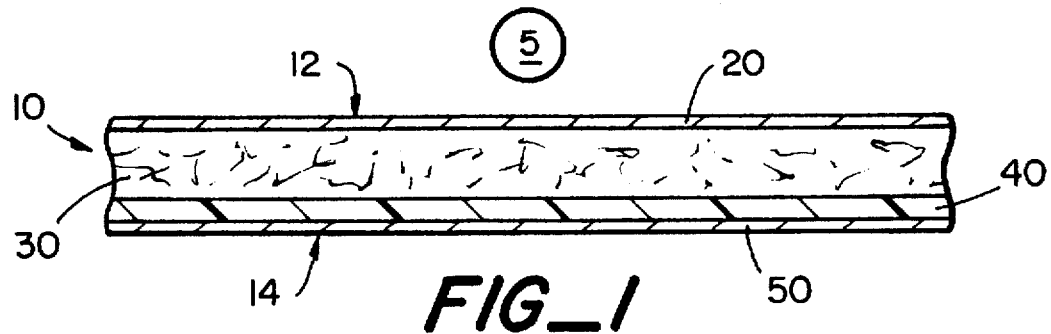
FIG_1
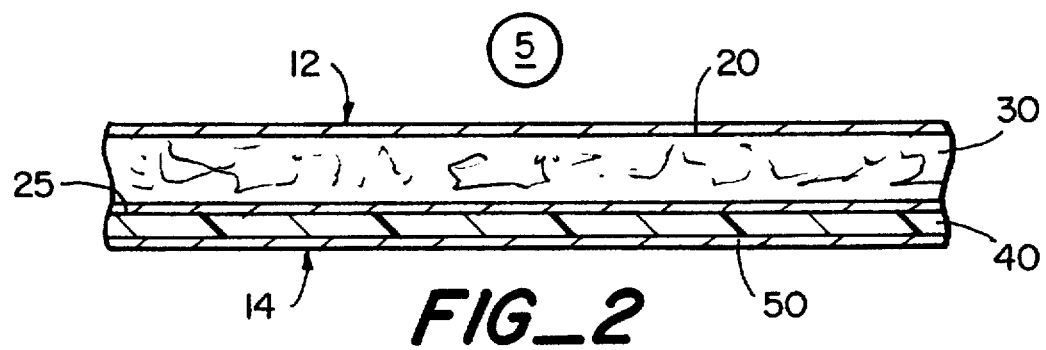
FIG_2
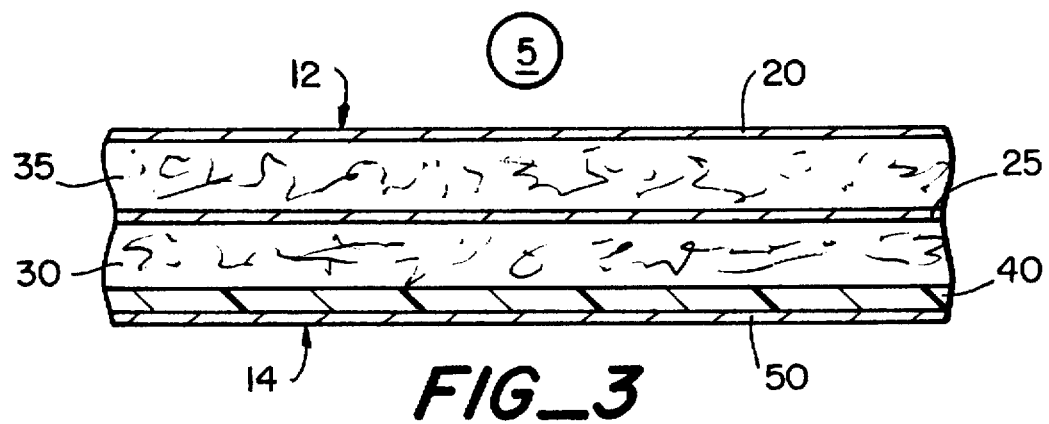
FIG_3
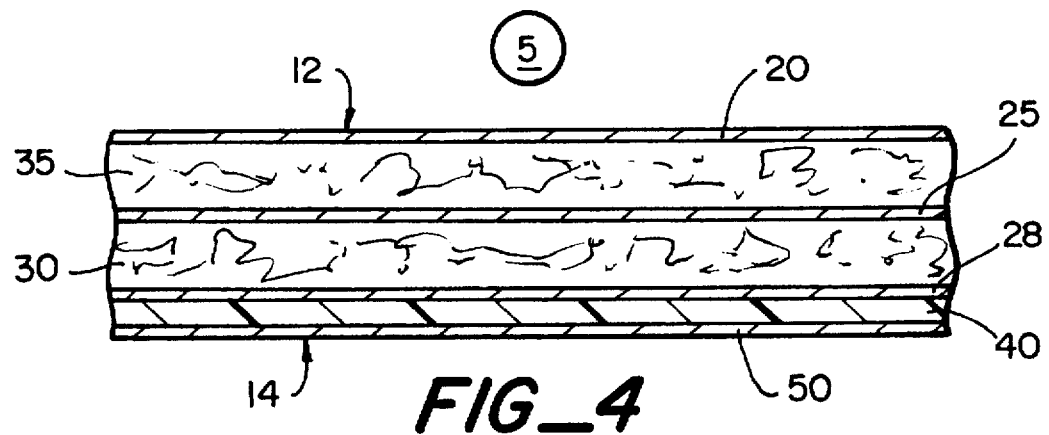
FIG_4

COMBINED THERMAL AND ACOUSTIC INSULATOR

FIELD OF THE INVENTION

The invention is related to insulating articles having multiple layers of material. More particularly, the invention is directed to combined thermal and acoustic insulating articles.

BACKGROUND AND SUMMARY

Frequently, there is a need for certain simultaneous thermal and acoustic insulating functions, and no single product has been known to satisfactorily perform both. Conventional thermal insulators typically have limited value in sound blocking. Acoustic barrier materials must often be limited to relatively low temperature exposure to prevent degradation of the materials and loss of function.

The present invention provides an insulator that overcomes the deficiencies in the art. An insulator according to the present invention has both good thermal and acoustic barrier properties and can be used in a variety of applications. The insulator provided by the invention is convenient to use, and being relatively thin and flexible, may be formed into a variety of shapes to conform to a number of structures to be insulated.

A combined thermal and acoustic insulator according to the invention comprises a first metallic material layer on the heat-exposed side of the insulator. The metallic layer, which is a thin metal foil or a metallized thin plastic layer, reflects a significant amount of heat. In the case of a metal foil, heat that is absorbed by the metal layer is conducted across the metal layer laterally from a peak heat spot, which averages the temperature of the first layer and minimizes local peak temperature.

Heat conducted through the foil encounters a layer of fibrous low density material batt having a low thermal conductivity. Adjacent the batt layer is a high density plastic material layer that acts as a barrier to acoustic energy. The first metal foil layer and the batt layer protect the acoustic absorbing layer from high heat exposure and permit the use of a wide variety of good acoustic insulating materials. A second metallic material layer may be positioned adjacent the high density plastic layer.

According to another aspect of the invention, additional metal foil and low density batt layers may be provided on the heat exposed side of the insulator for additional thermal insulating protection.

According to the invention, the metallic material layers may be formed of a metallic foil having a thickness in a range of 0.0005 to 0.006 inches and an emissivity lower than 0.4. Alternatively, any or all of the metallic material layers may be formed of a plastic material having a coating providing an emissivity of less than 0.4 and having a thickness in the range of 0.0005 to 0.006 inches.

According to another aspect of the invention, the fibrous low density material is selected from the group consisting of glass fiber, polyester fiber, organic fiber, and mineral fiber, and has a density in the range of 0.5 to 15 pounds per cubic foot.

According to yet another aspect of the invention, the high density plastic layer comprises a limp material with a high density filler. Preferably, the high density plastic material has a weight in a range of 0.25 to 2.0 pounds per square foot. The high density plastic material may preferably be a mass loaded elastomer selected from the group consisting of urethane, polyvinyl chloride, EPDM, EVA, silicone and other similar organic elastomers, loaded with a high density powder. According to the invention a suitable high density powder may be hematite, barium sulfate, metal powders, or other similar high density powders having an average particle size of less than 60 mesh. These materials are generally effective as acoustic barrier and damping. Other similar materials may be advantageously selected.

BRIEF DESCRIPTION OF THE DRAWINGS

The invention may be better understood by reference to the following description in conjunction with the appended drawings, in which:

FIG. 1 is a schematic view through a cross section of an insulator in accordance with the invention;

FIG. 2 is a schematic of the insulator of FIG. 1 showing the addition of a further metallic material layer adjacent a high density plastic layer;

FIG. 3 illustrates the insulator of FIG. 1 with a third metallic material layer and a second fibrous batt layer adjacent the high density plastic layer; and FIG. 4 illustrates the insulator of FIG. 1 with a third metallic material layer, a second fibrous batt layer and a fourth metallic material layer adjacent the high density plastic layer.

DETAILED DESCRIPTION

A combined thermal and acoustic insulator 10 according to the invention is illustrated schematically in FIG. 1. A heat source 5 is illustrated by a circle, and represents an object or area from which the insulator is intended to provide protection. The heat source 5 may be an engine, for example, an automobile engine, which generates a great deal of both heat and sound energy, and the insulator according to the invention may be used to insulate the passenger compartment from the engine. The insulator 10 has a heat exposed side 12 facing the heat source 5, and an opposite protected side 14.

The insulator 10 includes a first metallic material layer 20 on the heat exposed side 12 of the insulator. A fibrous low density material batt layer 30 is positioned adjacent the first metallic layer 20. A high density flexible plastic or rubber material layer 40 is positioned adjacent the batt layer 30 and a second metallic layer 50 is adjacent the high density layer 40. The second metallic layer 50 may be included on the shielded or protected side 14 of the structure.

The function of the insulator 10 for thermal and acoustic insulation is provided by the individual and cooperative functioning of the various layers.

The first and second metallic layers 20, 50 may be formed of a thin metal foil or a metallized, thin, flexible plastic layer. As used herein, metallic refers to a material made of metal or having a metal coating. At least the first layer 20 is selected to have a sufficiently low emissivity so that heat, in the form of conductive or radiant energy, striking the first layer is reflected in significant amount. The first layer 20 is preferably formed of a metal foil, for example, aluminum, having an emissivity lower than 0.4 and a thickness in the range of 0.0005 to 0.006 inches. A plastic metallized layer would be formed to have a thickness as defined, and a coating or treatment to have the defined emissivity.

Heat that is absorbed by the first layer 20 is, in part, conducted laterally throughout the first layer. Conduction of heat laterally from an incident location by the first layer 20 minimizes any local peak temperature that may otherwise exist on the insulator 10 by spreading the heat over a large area, and thus averaging the temperature of the first layer 20. A heat sink (not shown) in thermal contact with the first layer 10 may be provided at a point remote from the protected region to carry off conducted heat.

Heat transmitted through the first layer 20 encounters the first fibrous batt layer 30 which has low thermal conductivity, and therefore, inhibits the further penetration of heat.

As shown in FIGS. 2–4, additional layers of metallic material and fibrous batt may be disposed on the heat exposed side of the high density plastic layer. These layers act in the same manner as the first metallic layer 20 and fibrous batt layer 30 to inhibit the flow of heat through the insulator 10, and further distribute heat to minimize local peak temperatures.

As shown in FIG. 2, a third metallic material layer 25 may be disposed between the fibrous batt layer 30 and the high density plastic layer 40. FIG. 3 illustrates a third metallic material layer 25 and a second fibrous batt layer 35 disposed between the first fibrous batt layer 30 and the high density plastic layer 40. As shown in FIG. 4, a third metallic material layer 25, a second fibrous batt layer 35 and a fourth metallic material layer 28 are provided between the first metallic layer 20 and the high density plastic layer 40.

The fibrous batt layers 30, 35 may be formed of polyester fiber batt or any suitable fibrous insulating batt material having a density in the range of 0.5 to 15 lbs/ft$^3$. Other materials that are compressible and flexible are also suitable, including woven materials, and formed materials such as glass fiber, other organic fiber, and mineral fiber.

The first metallic layer 20 also partially absorbs acoustic energy incident on it by diaphragm action of the thin foil. An amount of acoustic energy is also absorbed by the fibrous batt material layer 30. The additional metallic layers and batt layer illustrated in the alternative constructions of FIGS. 2–5 also act to absorb an amount of acoustic energy.

The majority of acoustic energy is blocked by the high density layer 40. The high density layer 40 is positioned to back up the fibrous layer 30 on the shielded side. The metallic layers 20, 25 and the fibrous batt layers 30, 35 protect the high density acoustic insulating layer 40 from heat, which permits the use of acoustic absorbing materials that are relatively low temperature tolerant. The high density layer is formed, for example, of a flexible plastic or rubber material. Acoustic energy striking the high density layer 40 is neither significantly reflected nor allowed to penetrate through as a result of the mass of this layer. Preferably, the high density plastic material 40 has a weight in a range of 0.25 to 2.0 pounds per square foot. The high density layer 40 may be a mass loaded elastomer, and, for example, may be formed of materials such as polyvinyl chloride, urethane, EPDM, EVA, silicone or other similar organic elastomers loaded with a high density powder. According to the invention, suitable powders are hematite, barium sulfate, metal powder, or other similar high density powders having an average particle size of less than 60 mesh.

The high density layer 40 is backed up by the second metallic layer 50, which serves both as structural support and as additional insulating functional layer. An advantageous aspect of the invention is that the high density layer 40 may be deposited on the second metallic layer 50 as a reactive or molten elastomer or rubber and allowed to react or cure in place. The high density layer 40 would thus be formed and bonded to the backing metallic layer 50 in a simple and effective manner.

The second, third and fourth metallic layers (if provided) may be formed of a metal foil, or alternatively formed of a plastic material having a low emissivity surface coating, for example, a metallized plastic, or treated plastic, of comparable thickness to a metal foil as described above. In relatively low temperature applications, the first metallic layer 20, that is, on the heat exposed side, may also be formed of such a plastic material.

The combination of layers defined by the invention, including the foil and batt layers for heat insulation, permit a relatively thin structure to be constructed, but which performs a large heat insulating function. In addition, the various layers of the insulating structure 10 or 15 are flexible, which creates a structure that may be easily shaped to conform with variously shaped structures that are to be insulated.

The various layers may be bonded in a laminate structure by any suitable means, including hot melt adhesive, pressure sensitive adhesives, dry film adhesives, and solvent based adhesives.

The invention has been described in terms of preferred embodiments, components and principles, however, the invention may be practiced other than as specifically described and equivalents may be substituted by those of skill in the art without departing from the scope invention as defined in the following claims.

What is claimed is:

1. A combined thermal and acoustic insulator having a heat exposed side and a protected side, comprising:
   a first metallic material layer having an emissivity lower than 0.4;
   a fibrous low density material batt layer;
   a high density plastic material layer adjacent the batt material layer, the high density plastic material having a weight in a range of 0.25 to 2 pounds per square foot; and,
   a second metallic material layer adjacent the high density plastic material layer, the second layer having an emissivity lower than 0.4,
   wherein the first metallic material layer forms the heat exposed side and the second metallic layer forms the protected side.

2. The insulator as claimed in claim 1, wherein at least one of the first and second metallic material layers is formed of a metallic foil having a thickness of at least 0.0005 inches.

3. The insulator as claimed in claim 2, wherein the metallic foil has a thickness not greater than 0.006 inches.

4. The insulator as claimed in claim 1, wherein at least one of the first and second metallic material layers is formed of a plastic material having a coating providing an emissivity of less than 0.4.

5. The insulator as claimed in claim 4, wherein the plastic material has a thickness in the range of 0.0005 to 0.006 inches.

6. The insulator as claimed in claim 1, wherein the fibrous low density material has a density of at least 0.5 pounds per cubic foot.

7. The insulator as claimed in claim 1, wherein the fibrous low density material has a density in the range of 0.5 to 15 pounds per cubic foot.

8. The insulator as claimed in claim 1, wherein the fibrous low density material is selected from the group consisting of glass fiber, polyester fiber, organic fiber, and mineral fiber.

9. The insulator as claimed in claim 1, wherein the high density plastic material is a mass loaded elastomer selected from the group consisting of urethane, polyvinyl chloride, EPDM, EVA and silicone loaded with a high density powder.

10. The insulator as claimed in claim 9, wherein the high density powder has an average particle size of less than 60 mesh and is selected from the group consisting of hematite, barium sulfate and metal powder.

11. The insulator as claimed in claim 1, further comprising:
   a third metallic material layer disposed between the fibrous low density material batt layer and the high density plastic layer.

12. The insulator as claimed in claim 11, wherein the third metallic material layer is formed of a metallic foil having a thickness of at least 0.0005 inches and an emissivity less than 0.4.

13. The insulator as claimed in claim 12, wherein the metallic foil has a thickness not greater than 0.006 inches.

14. The insulator as claimed in claim 11, wherein the third metallic material layer is formed of a plastic material having a coating providing an emissivity of less than 0.4.

15. The insulator as claimed in claim 14, wherein the plastic material has a thickness in the range of 0.0005 to 0.006 inches.

16. The insulator as claimed in claim 1, further comprising:
   a third metallic material layer adjacent the fibrous low density material batt layer; and
   a second fibrous low density material layer between the second and third metallic material layers.

17. The insulator as claimed in claim 16, wherein the third metallic material layer is formed of a metallic foil having a thickness of at least 0.0005 inches and an emissivity less than 0.4.

18. The insulator as claimed in claim 16, wherein the metallic foil has a thickness not greater than 0.006 inches.

19. The insulator as claimed in claim 16, wherein the third metallic material layers is formed of a plastic material having a coating providing an emissivity of less than 0.4.

20. The insulator as claimed in claim 19, wherein the plastic material has a thickness in the range of 0.0005 to 0.006 inches.

21. The insulator as claimed in claim 16, wherein the second fibrous low density material has a density in the range of 0.5 to 15 pounds per cubic foot.

22. The insulator as claimed in claim 16, wherein the second fibrous low density material is selected from the group consisting of glass fiber, polyester fiber, organic fiber, and mineral fiber.

23. The insulator as claimed in claim 1, further comprising:
   a third metallic material layer adjacent the fibrous low density material batt layer;
   a second fibrous low density material layer between the second and third metallic material layers; and,
   a fourth metallic material layer between the second low density batt layer and the high density plastic material layer.

24. The insulator as claimed in claim 23, wherein at least one of the third metallic material layer and fourth metallic material layer is formed of a metallic foil having a thickness of at least 0.0005 inches and an emissivity less than 0.4.

25. The insulator as claimed in claim 24, wherein the metallic foil has a thickness not greater than 0.006 inches.

26. The insulator as claimed in claim 23, wherein at least one of the third metallic material layer and the fourth metallic material layer is formed of a plastic material having a coating providing an emissivity of less than 0.4.

27. The insulator as claimed in claim 26, wherein the plastic material has a thickness in the range of 0.0005 to 0.006 inches.

28. The insulator as claimed in claim 23, wherein the second fibrous low density material has a density in the range of 0.5 to 15 pounds per cubic foot.

29. The insulator as claimed in claim 28, wherein the second fibrous low density material has a density in the range of 0.5 to 15 pounds per cubic foot.

30. The insulator as claimed in claim 23, wherein the second fibrous low density material is selected from the group consisting of glass fiber, polyester fiber, organic fiber, and mineral fiber.

\* \* \* \* \*